Figure 1:
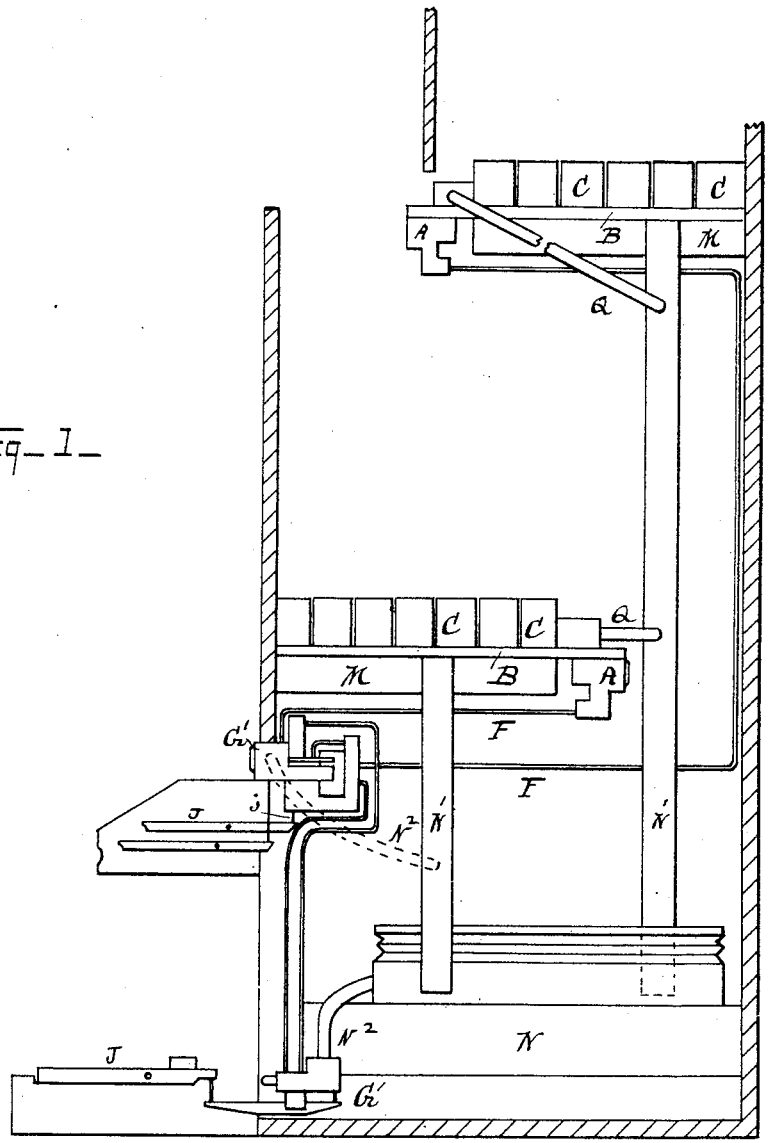

(No Model.) 2 Sheets—Sheet 1.

E. S. VOTEY & W. D. WOOD.
FRESH WIND BOX FOR PIPE ORGANS.

No. 475,832. Patented May 31, 1892.

Witnesses
John Schuman.
John F. Miller

Inventors
Edwin S. Votey
William D. Wood
By their Attorney
Newell S. Wright.

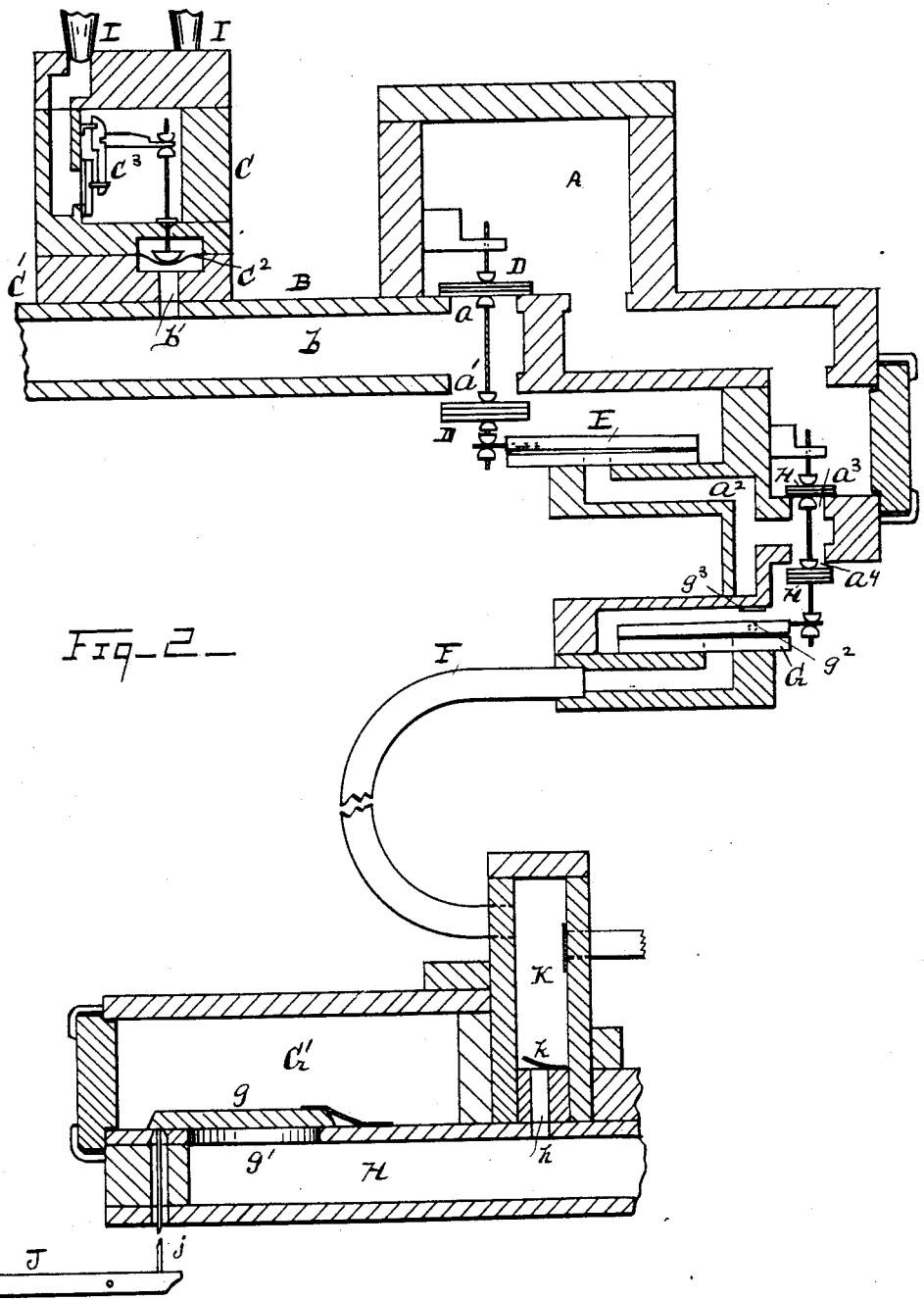

UNITED STATES PATENT OFFICE.

EDWIN S. VOTEY AND WILLIAM D. WOOD, OF DETROIT, MICHIGAN.

FRESH-WIND BOX FOR PIPE-ORGANS.

SPECIFICATION forming part of Letters Patent No. 475,832, dated May 31, 1892.

Application filed July 20, 1891. Serial No. 400,139. (No model.)

*To all whom it may concern:*

Be it known that we, EDWIN S. VOTEY and WILLIAM D. WOOD, citizens of the United States, residing at Detroit, county of Wayne, State of Michigan, have invented a certain new and useful Improvement in Fresh-Wind Boxes for Pipe-Organs; and we declare the following to be a full, clear, and exact description of the invention, such as will enable others skilled in the art to which it appertains to make and use the same, reference being had to the accompanying drawings, which form a part of this specification.

Our present invention relates to certain new and useful improvements in pipe-organs, and more especially to providing pipe-organs with fresh-wind boxes to furnish a fresh supply of air to manipulate the valve mechanism employed in connection with the wind-chests to control the wind-passage leading therefrom to the pipes.

The object of our invention is to furnish to the wind-chest a fresh supply of wind to operate the valve mechanism from an independent source near at hand, in order to insure greater wind force and secure a quicker and more satisfactory action of the valves, the fresh supply being independent of wind supplies for other purposes, except that of course it is itself supplied from the primary bellows.

It is obvious that the pressure of the wind in the various tubes and trunks controlled by the stops and keys as heretofore constructed and arranged is to a considerable degree spent before reaching the wind-chests, so that its action is not so quick and strong as though a fresh supply was furnished and brought into use to operate the valves of the wind-chest.

Our invention is designed and adapted to secure these beneficial results and overcome the former hinderances.

We accomplish our object as hereinafter more fully described, and pointed out in the claims and illustrated in the accompanying drawings, in which—

Figure 1 is a general diagram view illustrating our invention, showing the organ-case in section and certain interior parts in elevation. Fig. 2 is a view in section embodying our invention.

We carry out our invention as follows:

A represents a fresh-wind box embodying our invention.

B is a channel-board provided with a series of channels $b$, leading to one or more wind-chests C. The wind-chests shown herewith form the subject-matter of a separate application filed of even date herewith.

The wind-box A communicates with each of the channels $b$ through an opening $a$. The channel exhausts through an opening $a'$. These openings $a$ $a'$ are controlled by a double valve D, operated, as shown, by a pneumatic E. Wind is supplied to this pneumatic in the following manner:

F is a key-controlled pipe or duct leading to a pneumatic G. Leading from the wind-box to the pneumatic E is an air-duct $a^2$, communicating with the wind-box, as at $a^3$, and exhausting through an opening $a^4$. These openings $a^3$ $a^4$ are controlled by a double valve H, connected to and operated by the pneumatic G.

It is evident that when wind is admitted to inflate the pneumatic G it thereby lifts the valve H, closing the exhaust-opening $a^4$ and opening the opening $a^3$, admitting wind from the wind-box A into the duct $a^2$, thereby inflating the pneumatic E and lifting the valve D, closing the exhaust-opening $a'$, and admitting fresh wind from the wind-box to the channel-board.

C' is the base of the wind-chest C and is provided with a pneumatic $C^2$ to operate a valve mechanism $C^3$, admitting wind from the wind-chest C to the pipes I, connected therewith. Wind is admitted through the channel-board by means of a duct $b'$ to operate said pneumatic.

J is a key on the manual corresponding to the duct F.

G' is an air-trunk, which is constantly filled with wind when the organ is in use, the same being provided with a suitable valve $g$ for each of the keys, the valve being operated by the key through the intervention of a sticker $j$. The valve controls an orifice $g'$ in said trunk, leading into an air-duct H, said duct in turn leading into a flapper-box provided with a flapper or other valve $k$, controlling the orifice leading from the duct H into said box. From this box air passes to the duct F, As shown in Fig. 1, the organ may be provided with a series of such fresh-wind boxes corresponding to the number of manuals or arrangement of wind-chests, the fresh-wind boxes being particularly adapted for use with a series of separate and independent wind-chests, each corresponding to the set of pipes controlled by one stop, as in the accompanying application above referred to, although we do not limit ourselves solely thereto.

M is a wind-trunk to supply air to the wind-chests, which are preferably arranged in series in connection therewith.

N denotes the bellows.

N' denotes an air-trunk leading from the bellows to the trunks M. Q represents air-trunks supplying the fresh-wind boxes. These trunks Q may lead from the trunks N' or otherwise, as may be desired.

$N^2$ is a trunk supplying air to the trunk G' and which may also lead from trunk N' or otherwise.

To exhaust the pneumatic G, the upper wing is provided with a small orifice, (indicated in dotted lines at $g^2$, Fig. 2.) Just above said orifice is a cushion $g^3$, preferably of felt, against which the upper wing of the pneumatic closes when inflated. When the inflation ceases, the upper wing drops away from the cushion $g^3$ and is free to exhaust. The cushion, being made of felt, is porous and does not close the orifice so tight but that sufficient air can pass therethrough to prevent suction.

What we claim as our invention is—

1. In a pipe-organ, the combination, with a wind-chest provided with mechanism to control the passage of wind therefrom to the pipes, of a fresh-wind box to supply air to operate said mechanism, substantially as described.

2. In a pipe-organ, the combination, with one or more separate wind-chests corresponding to a set of pipes and provided with mechanism to control the passage of wind therefrom to the pipes, of a fresh-wind box to supply air to operate said mechanism, substantially as described.

3. In a pipe-organ, the combination, with a wind-chest having air-ducts leading thereto, of a fresh-wind box communicating with said ducts, substantially as and for the purpose described.

4. The combination, with a wind-chest having air-ducts leading thereto, of a fresh-wind box communicating with said ducts and key-operated valves to control the communication of said box with said ducts, substantially as described.

5. The combination, with a wind-chest provided with an air-conduit leading thereto, having an exhaust-port, of a fresh-wind box communicating with said duct and a key-operated valve to control said communication and said exhaust-port, substantially as described.

6. In an organ, the combination of a wind-chest provided with mechanism to control the passage of wind therefrom to the pipes, a fresh-wind box communicating with the wind-chest to supply air to operate said wind-chest mechanism, a valve to control said communication, a pneumatic engaged with said valve, a duct leading from said fresh-wind box to said pneumatic, and a valve to control the communication of said box with said duct, substantially as described.

7. In an organ, the combination of a wind-chest provided with mechanism to control the passage of wind therefrom to the pipes, a fresh-wind box communicating with the wind-chest to supply air to operate said wind-chest mechanism, a valve to control said communication, a pneumatic engaged with said valve, a duct leading from said box to said pneumatic, a valve to control the communication of said box with said duct, a pneumatic to operate said latter valve, and a key-controlled air-duct leading to said latter pneumatic, substantially as described.

8. In an organ, the combination, with wind-chests arranged in separate divisions, of a fresh-wind box for each of said divisions, substantially as described.

9. In an organ, the pneumatic G, constructed with one of its wings perforated, as at $g^2$, to allow the pneumatic to exhaust, having in combination therewith a cushion $g^3$, located adjacent thereto, to close said orifice when the pneumatic is inflated, substantially as described.

In testimony whereof we sign this specification in the presence of two witnesses.

EDWIN S. VOTEY.
WILLIAM D. WOOD.

Witnesses:
N. S. WRIGHT,
JOHN F. MILLER.